Patented May 7, 1946

2,399,974

UNITED STATES PATENT OFFICE 2,399,974

MANUFACTURE OF SUBSTITUTED DERIVATIVES OF 3-KETOTETRAHYDROTHIOPHENE

Anthony William d'Aubigny Avison, Franz Bergel, and John Wynne Haworth, Welwyn Garden City, England, assignors to Roche Products Limited, Welwyn Garden City, England No Drawing. Application December 18, 1943, Serial No. 514,860. In Great Britain December 22, 1942

5 Claims. (Cl. 260—329)

The present invention relates to the manufacture of the hitherto unknown substances of the general formula

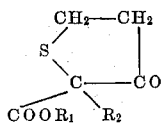

where $R_1$ is an alkyl group and $R_2$ is an alkyl or substituted alkyl or fatty acid group. According to the present invention these substances are manufactured by reacting substances of the general formula

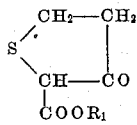

with an alkyl or substituted alkyl halide or halogenated fatty acid derivative in the presence of an alkaline condensing agent such as sodium ethylate.

The preparation of the hitherto unknown substances of the general formula II by causing dibasic acid esters of the type

$R_1OOC.CH_2.S.CH_2.CH_2.COOR_2$ where $R_1$ and $R_2$ are alkyl, to undergo ring closure with elimination of an alcohol $R_2OH$ in the presence of alkaline condensing agents, is the subject of our co-pending application Ser. No. 514,861 filed concurrently herewith.

The following examples in which quantities are expressed as parts by weight illustrate the manner in which the present invention can be carried into effect.

Example 1

5.2 parts of 2-carbethoxy-3-keto-tetrahydrothiophene prepared as described in our co-pending application are added to an alcoholic solution of sodium ethylate (prepared by dissolving 0.69 part of sodium in 15 parts of absolute alcohol); 6.8 parts of beta-iodopropionic ethyl ester are then added, the mixture allowed to stand for 3 hours at room temperature, after which it is heated under reflux for a further 6 hours. It is then poured into an excess of water containing sufficient sulphuric acid to render the mixture acid to litmus, and extracted with ether. The ethereal extract is washed with sodium bicarbonate solution, then with water and dried over sodium sulphate. The ether is then evaporated and the residue distilled under reduced pressure. 2-carbethoxy-2-(beta-carbethoxyethyl) - 3-keto-tetrahydrothiophene is obtained as a yellow oil, B. P. 195–198° C. 15 mm.

Example II 3.48 parts of 2-carbethoxy-3-keto-tetrahydrothiophene are added to an alcoholic solution of sodium ethylate, prepared by dissolving 0.46 part of sodium in 15 parts of absolute alcohol. 6.56 parts of γ-iodo propylmalonic ethyl ester are added, and the mixture heated for 12 hours at 110° in a sealed tube. The mixture is then poured into water, extracted with ether, the extract washed with water, and dried over sodium sulphate. The ether is evaporated and the residue distilled under reduced pressure. 2-carbethoxy-2-(δ-dicarbethoxy butyl)-3-keto-tetrahydrothiophene is obtained as a viscous yellow oil, B. P. 170–180° C./0.2 mm.

We claim:

1. A process for the manufacture of substances of the general formula

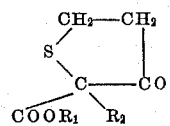

in which $R_1$ is an alkyl group and $R_2$ is a fatty acid group which comprises heating a substance of the general formula

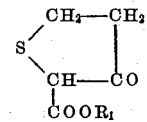

with a halogenated carbalkoxyalkyl ester in the presence of an alkaline condensing agent.

2. A process for the manufacture of substances of the general formula

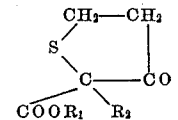

in which $R_1$ is an alkyl group and $R_2$ is a fatty acid group which comprises heating a substance of the general formula

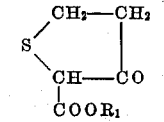

with a halogenated carbalkoxyalkyl ester in the presence of sodium ethylate.

3. As new substances compounds of the general formula

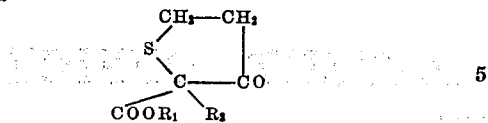

in which R₁ is an alkyl group and R₂ is a carbalkoxyalkyl group.

4. As a new substance 2-carbethoxy-2-(beta-carbethoxyethyl) - 3 - keto-tetrahydrothiophene having the formula

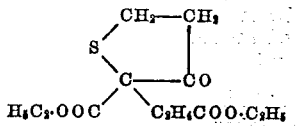

5. As a new substance 2-carbethoxy-2-(δ-dicarbethoxy butyl) - 3 - keto-tetrahydrothiophene having the formula

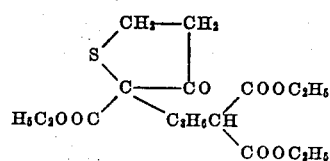

ANTHONY WILLIAM D'AUBIGNY AVISON.
FRANZ BERGEL.
JOHN WYNNE HAWORTH.